May 31, 1938. H. S. SIMPSON Re. 20,747

BEARING SEAL FOR MULLING MACHINES

Original Filed Oct. 3, 1932

Inventor
Herbert S. Simpson.
by: Charles W. Hills
Attys.

Reissued May 31, 1938

Re. 20,747

UNITED STATES PATENT OFFICE 20,747

BEARING SEAL FOR MULLING MACHINES

Herbert S. Simpson, Chicago, Ill.

Original No. 1,985,063, dated December 18, 1934, Serial No. 635,996, October 3, 1932. Application for reissue July 15, 1936, Serial No. 90,809

13 Claims. (Cl. 83—45)

This invention relates to a sand mixing machine and concerns itself primarily with a bearing structure susceptible of adjustment externally of the machine and without the necessity for disassembling any parts.

The invention comprises the novel structure and combination of parts hereinafter described and more particularly pointed out and defined in the appended claims.

In the accompanying drawing which illustrates a preferred form of this invention and in which similar reference numerals refer to similar features in the different views.

Figures 1, 2:
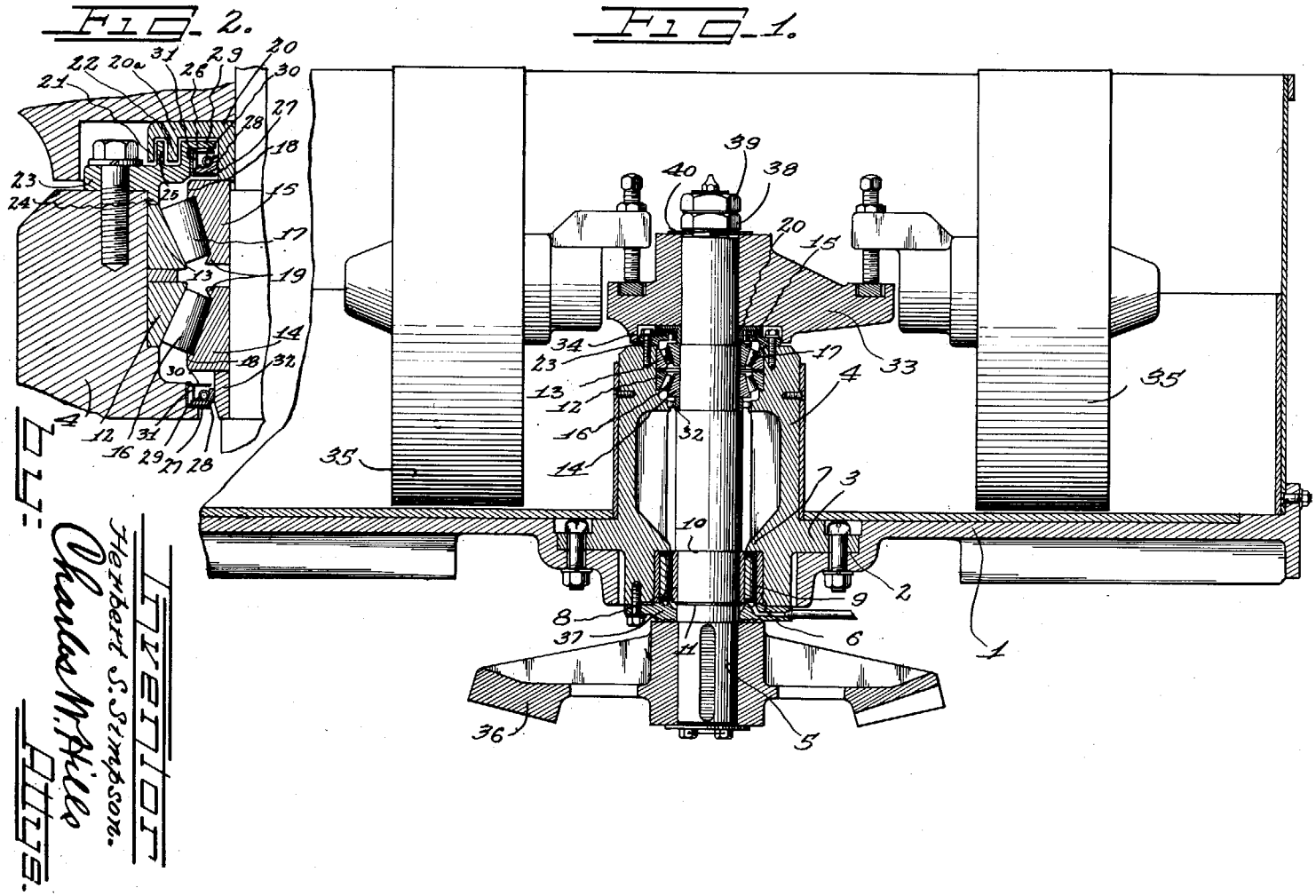
Figure 1 is a fragmentary sectional view through a sand mixing machine involving this invention with parts shown in elevation.
Figure 2 is an enlarged fragmentary sectional view illustrating the bearing and seal therefor.

In the drawing, there is shown a sand mixing or mulling pan 1, the bottom of which is provided with a central opening surrounded by a downwardly offset flange 2. The flange 2 forms a seat for a radially extending flange 3 on a vertical hollow sleeve or bearing member 4 called a turret extending through the aperture in the base. This hollow bearing member or turret extends to a suitable height above the bottom of the pan for supporting the operating mechanism of the machine.

A vertical shaft 5 extends through the hollow bearing member or turret and is journalled therein by means of anti-friction bearings which can be adjusted through vertical movement of the shaft. The lower end of the sleeve or turret 4 has a cylindrical bushing 6 therein which abuts an interior shoulder 7 formed on the sleeve or turret. A bushing 8 surrounds the shaft 5 in concentric relation with the bushing 6. Cylindrical rollers 9 are located between the two bushings which serve as bearings therefor. It will be noted that the upper end of the bearing bushing 8 abuts an annular shoulder 10 on the shaft and that a spring retainer 11 which may be partly lodged in a shallow groove in the shaft abuts the lower end of the bushing 8.

Within the upper end of the sleeve or turret 4 are annular conical bearing rings 12 and 13. A conical bearing ring 14 is secured upon the shaft 5 in concentric relation to the bearing ring 12. A second conical bearing ring 15 is mounted upon the shaft 5 in concentric relation to the bearing ring 13 for relative slidable movement under certain conditions. Conical rollers 16 are located between the conical bearing rings 12 and 14 and conical rollers 17 are located between the bearing rings 13 and 15. The divergence of the bearing surfaces of the rings is toward the shaft.

The bearing rings 14 and 15 upon the shaft are provided with roller raceways having terminal shoulders 18 and 19 between which the rollers are confined against relative shifting movement in a vertical direction. The rings 12 and 13, however, have plain bearing surfaces over which the rollers can be adjusted in vertical direction.

A sealing ring 20 is mounted upon the shaft 5 above the conical ring 15. This ring has an outstanding flange 20*a* provided with concentric and downwardly extending ribs 21 and 22. A sealing ring 23 is fastened upon the top of the sleeve or turret 4. This sleeve has a short annular flange 24 that fits within the upper end of the sleeve or turret 4 and forms an abutment for the ring 13. The ring 23 has an upwardly extending rib 25 located between the ribs 21 and 22 and an upward L-shaped portion 26 that is located between the rib 22 and the attaching portion of the ring 20 that surrounds the shaft 5.

Within the L-shaped portion 26 of rings 23 there is an L-shaped ring 27 having one flange abutting one leg of the L-shaped portion 26, and the other flange extending in a horizontal plane adjacent the bearing 13. A curved ring 28 which rests upon the horizontal flange of ring 27 and abuts the hub of ring 20 bridges the gap between the ring 27 and the hub of ring 20. A resilient wire ring 29 or the like surrounds the curved ring 28 and yieldingly maintains the same against its contacting parts.

A metal ring 30 in spaced relation to the ring 28 may be fastened to the upstanding flange of the ring 27 and supported by a vertical ring 31 supported upon the ring 28. This construction provides an effective seal for the bearing.

A narrow sleeve 32 may be attached to the shaft 5 below the bearing 14 to support the same when the shaft is adjusted and the parts 27, 28, 29, 30 and 31 may be interposed between the sleeve 32 and the sleeve or turret 4 to seal the lower part of the bearing.

A spider 33 is secured upon the upper end of the shaft 5 and is provided with a lower annular flange 34 that surrounds the sealing rings 20 and 23 to exclude the dust arising from the mixing and agitation of the sand. This spider carries the mullers 35 that travel upon the sand in the pan. The shaft is adapted to be revolved by means of a gear 36 attached to the lower end thereof and a ring 37 which surrounds the shaft 5 between the gear and the lower end of the sleeve or turret 4 is removably bolted to the lower end of the sleeve or turret 4 for retaining the lower rollers 9 in place.

The upper end of the shaft 5 is threaded for receiving the nuts 38 and 39 the latter of which may be a lock nut, and a washer 40 is preferably placed between the spider and the nuts 38.

When the cone bearings require adjustment in the event of wear or for any other reason, the nuts 38 and 39 may be screwed down against the spider for causing the shaft to move upwardly. During this movement of the shaft, the cone bearing 14 which rests upon the collar 32 will move upwardly with the shaft and carry the rollers 16 therewith until they wedge between their bearings. For it will be noted that the space between the bearings decreases as the bearing 14 is elevated. When the rollers 16 begin to wedge between their bearings, it will of course be impossible to elevate the shaft 5 any further so that further pressure of the nuts against the spider will force the same downwardly and cause the ring 20 to force cone bearing 15 downwardly for taking up the looseness of the rollers 17.

From the foregoing, it will be apparent that a novel and easily accessible adjustment has been provided for the inaccessible bearings upon a muller shaft and in which the bearings are effectively sealed against the ingress of sand and dust.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a machine of the class described, a vertical sleeve, a vertical shaft in said sleeve, bearings between the shaft and the upper end of said sleeve, a sealing ring attached to the upper end of said sleeve and extending over said bearing, said ring having an upwardly extending annular rib and an upwardly extending portion spaced inwardly from said rib and provided with a horizontal flange directed toward said shaft, a second sealing ring having a vertical flange surrounding said shaft and an outwardly directed flange extending over said first sealing ring, said second sealing ring having downwardly directed spaced annular ribs for receiving the rib of the first sealing ring therebetween, a sealing element bearing against the first sealing ring beneath the horizontal flange thereof, a sealing element bearing against the vertical flange of said second sealing ring and yielding means between said sealing elements.

2. In a machine of the class described, a vertical sleeve, a vertical shaft extending through said sleeve, bearings between said shaft and sleeve including a bearing between the upper end portion of said sleeve and shaft, a sealing ring attached to the upper end of said sleeve and overlying the upper bearing, a second sealing ring having a vertical flange surrounding said shaft, and a horizontal flange overlying the first sealing ring, said sealing rings having interfitting parts, means between said first sealing ring and the vertical flange of the second sealing ring for sealing the space between said rings, and a head on said shaft having a recess for receiving said sealing rings.

3. In a muller having a vertical driving shaft, a vertical sleeve surrounding said shaft, upper bearings between said shaft and sleeve, including an inner raceway mounted on said shaft, and an outer raceway mounted on said sleeve, anti-friction means located between said raceways, an adjustable seal cover for said bearings surrounding said shaft and adapted to impart movement to said inner raceway for adjusting the same, and means for adjusting said seal cover and said inner raceway lengthwise of said shaft, and a stationary seal cover mounted on said sleeve and having means for engaging and holding in position said outer raceway, said stationary seal cover and said adjustable seal cover each having cooperating means to form a seal for said bearings, and other bearings located between said shaft and said sleeve adjacent the lower end of said sleeve.

4. In a muller having a vertical driving shaft, a vertical sleeve surrounding said shaft, upper bearings between said shaft and sleeve, including an inner raceway mounted on said shaft, and an outer raceway mounted on said sleeve, anti-friction means located between said raceways, an adjustable seal cover for said bearings surrounding said shaft and adapted to impart movement to said inner raceway for adjusting the same, and means for adjusting said seal cover and said inner raceway lengthwise of said shaft, and a stationary seal cover mounted on said sleeve and having means for engaging and holding in position said outer raceway, said stationary seal cover and said adjustable seal cover each having cooperating means to form a seal for said bearings, and other bearings located between said shaft and said sleeve adjacent the lower end of said sleeve, and a muller wheel carrying a spider mounted on said shaft, and interposed between said seal covers and said adjusting means.

5. In a muller having a vertical driving shaft, a vertical sleeve surrounding said shaft, upper bearings between said shaft and sleeve, including an inner raceway mounted on said shaft, and an outer raceway mounted on said sleeve, anti-friction means located between said raceways, an adjustable seal cover for said bearings surrounding said shaft and adapted to impart movement to said inner raceway for adjusting the same, and means on the end of said shaft for adjusting said seal cover and said inner raceway lengthwise of said shaft, and a stationary seal cover mounted on said sleeve, and having means for engaging and holding in position said outer raceway, said stationary seal cover and said adjustable seal cover each having cooperating means to form a seal for said bearings, and other bearings located between said shaft and said sleeve adjacent the lower end of said sleeve.

6. In a muller having a vertical driving shaft, a vertical sleeve surrounding said shaft, upper bearings between said shaft and sleeve, including an inner raceway mounted on said shaft, and an outer raceway mounted on said sleeve, anti-friction means located between said raceways, an adjustable seal cover for said bearings surrounding said shaft and adapted to impart movement to said inner raceway for adjusting the same, and means for adjusting said seal cover and said inner raceway lengthwise of said shaft, and a stationary seal cover mounted on said sleeve and having a shoulder, means for engaging and holding in position said outer raceway, said stationary seal cover and said adjustable seal cover each having cooperating means to form a seal for said bearings, and other bearings located between said shaft and said sleeve adjacent the lower end of said sleeve.

7. In a muller having a vertical driving shaft, a vertical sleeve surrounding said shaft, upper bearings between said shaft and sleeve, including an inner raceway mounted on said shaft, and an outer raceway mounted on said sleeve, anti-friction means located between said raceways, an adjustable seal cover for said bearings surrounding said shaft and adapted to impart movement to said inner raceway for adjusting the same, and means for adjusting said seal cover and said inner raceway lengthwise of said shaft, and a stationary seal cover mounted on said sleeve and having means for engaging and holding in position said outer raceway, said stationary seal cover and said adjustable seal cover each having cooperating means to form a seal, said cooperating means comprising a plurality of downwardly directed spaced annular ribs mounted on said adjustable seal cover, and a plurality of upwardly directed ribs mounted on said stationary seal cover.

8. In a muller having a vertical driving shaft, a vertical sleeve surrounding said shaft, upper bearings between said shaft and sleeve, including an inner raceway mounted on said shaft, and an outer raceway mounted on said sleeve, anti-friction means located between said raceways, an adjustable seal cover for said bearings surrounding said shaft and adapted to impart movement to said inner raceway for adjusting the same, and means for adjusting said seal cover and said inner raceway lengthwise of said shaft, and a stationary seal cover mounted on said sleeve and having means for engaging and holding in position said outer raceway, said stationary seal cover and said adjustable seal cover each having cooperating means to form a seal, said cooperating means comprising a plurality of downwardly directed spaced annular ribs mounted on said adjustable seal cover, and a plurality of upwardly directed ribs mounted on said stationary seal cover, and a sealing element bearing against one of said vertical ribs, and yielding means located between said adjustable and stationary seal covers.

9. In a muller having a vertical driving shaft, a vertical sleeve surrounding said shaft, upper bearings between said shaft and sleeve, including a pair of inner raceways mounted on said shaft and a pair of outer raceways mounted on said sleeve, anti-friction means located between each inner and outer raceway, an adjustable seal cover mounted on said shaft above said raceways, surrounding said shaft above said raceways, and means for adjusting said seal cover and one of said raceways, lengthwise of said shaft, and a stationary seal cover mounted on said sleeve and having means for engaging and holding in position said outer raceway, said stationary seal cover and said adjustable seal over each having cooperating means to form a seal for said bearings, and other bearings located between said shaft and said sleeve adjacent the lower end of said sleeve.

10. In a muller having a vertical driving shaft, a vertical sleeve surrounding said shaft, upper bearings between said shaft and sleeve, including a pair of inner raceways mounted on said shaft and a pair of outer raceways mounted on said sleeve, anti-friction means located between each inner and outer raceway, an adjustable seal cover mounted on said shaft above said raceways, surrounding said shaft above said raceways, and means for adjusting said seal cover and one of said raceways lengthwise of said shaft, and a stationary seal cover mounted on said sleeve and having means for engaging and holding in position said outer raceway, said stationary seal cover and said adjustable seal cover each having cooperating means to form a seal for said bearings, and other bearings located between said shaft and said sleeve adjacent the lower end of said sleeve, said upper bearings being opposed tapered roller bearings.

11. In a muller having a vertical driving shaft, a vertical sleeve surrounding said shaft, upper bearings between said shaft and sleeve, including an inner raceway mounted on said shaft, and an outer raceway mounted on said sleeve, anti-friction means located between said raceways, an adjustable seal cover for said bearings surrounding said shaft and adapted to impart movement to said inner raceway for adjusting the same, and means for adjusting said seal cover and said inner raceway lengthwise of said shaft, and a stationary seal cover mounted on said sleeve and having means for engaging and holding in position said outer raceway, said stationary seal cover and said adjustable seal cover each having cooperating means to form a seal for said bearings, and other bearings located between said shaft and said sleeve adjacent the lower end of said sleeve, and a clamping plate surrounding said shaft below said lower bearings, said clamping plate and said adjustable seal cover serving to retain said bearings in position, and shoulders on said vertical sleeve for supporting said bearings when so clamped in position.

12. In a muller having a vertical driving shaft, a vertical sleeve surrounding said shaft, upper bearings between said shaft and sleeve, including an inner raceway mounted on said shaft, and an outer raceway mounted on said sleeve, anti-friction means located between said raceways, an adjustable seal cover for said bearings surrounding said shaft and adapted to impart movement to said inner raceway for adjusting the same, and means for adjusting said seal cover and said inner raceway lengthwise of said shaft, and a stationary seal cover mounted on said sleeve and having means for engaging and holding in position said outer raceway, said stationary seal cover and said adjustable seal cover each having cooperating means to form a seal for said bearings, and other bearings located between said shaft and said sleeve adjacent the lower end of said sleeve, and a clamping plate surrounding said shaft below said lower bearings, said clamping plate and said adjustable seal cover serving to retain said bearings in position, and shoulders on said vertical sleeve for supporting said bearings when so clamped in position, and a spider on the upper end of said shaft having depending skirt means enclosing the upper clamping plate.

13. In a muller having a vertical driving shaft, a vertical sleeve surrounding said shaft, upper bearings between said shaft and sleeve, including an inner raceway mounted on said shaft, and an outer raceway mounted on said sleeve, anti-friction means located between said raceways, an adjustable seal cover for said bearings surrounding said shaft and adapted to impart movement to said inner raceway for adjusting the same, and means for adjusting said seal cover and said inner raceway lengthwise of said shaft, and a stationary seal cover mounted on said sleeve and having means for engaging and holding in position said outer raceway, said stationary seal cover and said adjustable seal cover each having cooperating means to form a seal for said bearings, and other bearings located between said shaft and said sleeve adjacent the lower end of said sleeve, and a clamping plate surrounding said shaft below said lower bearings, said clamping plate and said adjustable seal cover serving to retain said bearings in position, and shoulders on said vertical sleeve for supporting said bearings when so clamped in position, and a spider on the upper end of said shaft having depending skirt means enclosing the upper clamping plate, and means for feeding lubricant to the bearings in the turret without disassembling the mechanism.

HERBERT S. SIMPSON.